INVENTORS
WILLIAM R. HORST &
STANLEY F. COIL

BY Louis A Kline
Elmer I Vargo

THEIR ATTORNEYS

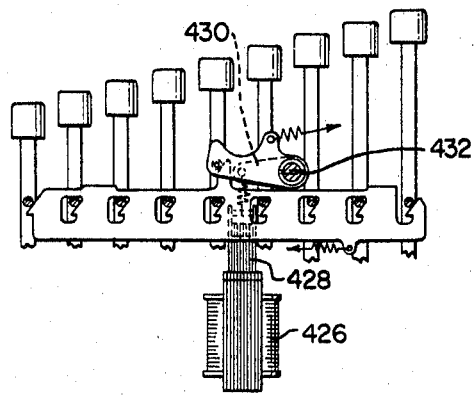
FIG. 10
FIG. 3a
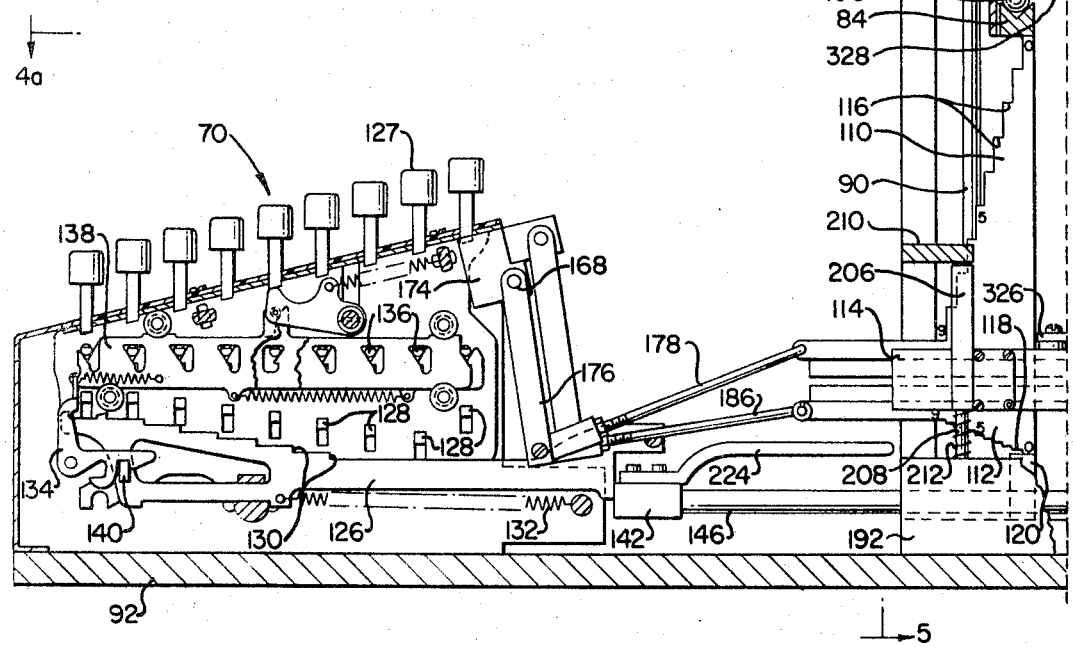

INVENTORS
WILLIAM R. HORST &
STANLEY F. COIL

BY

THEIR ATTORNEYS

INVENTORS
WILLIAM R. HORST &
STANLEY F. COIL

THEIR ATTORNEYS

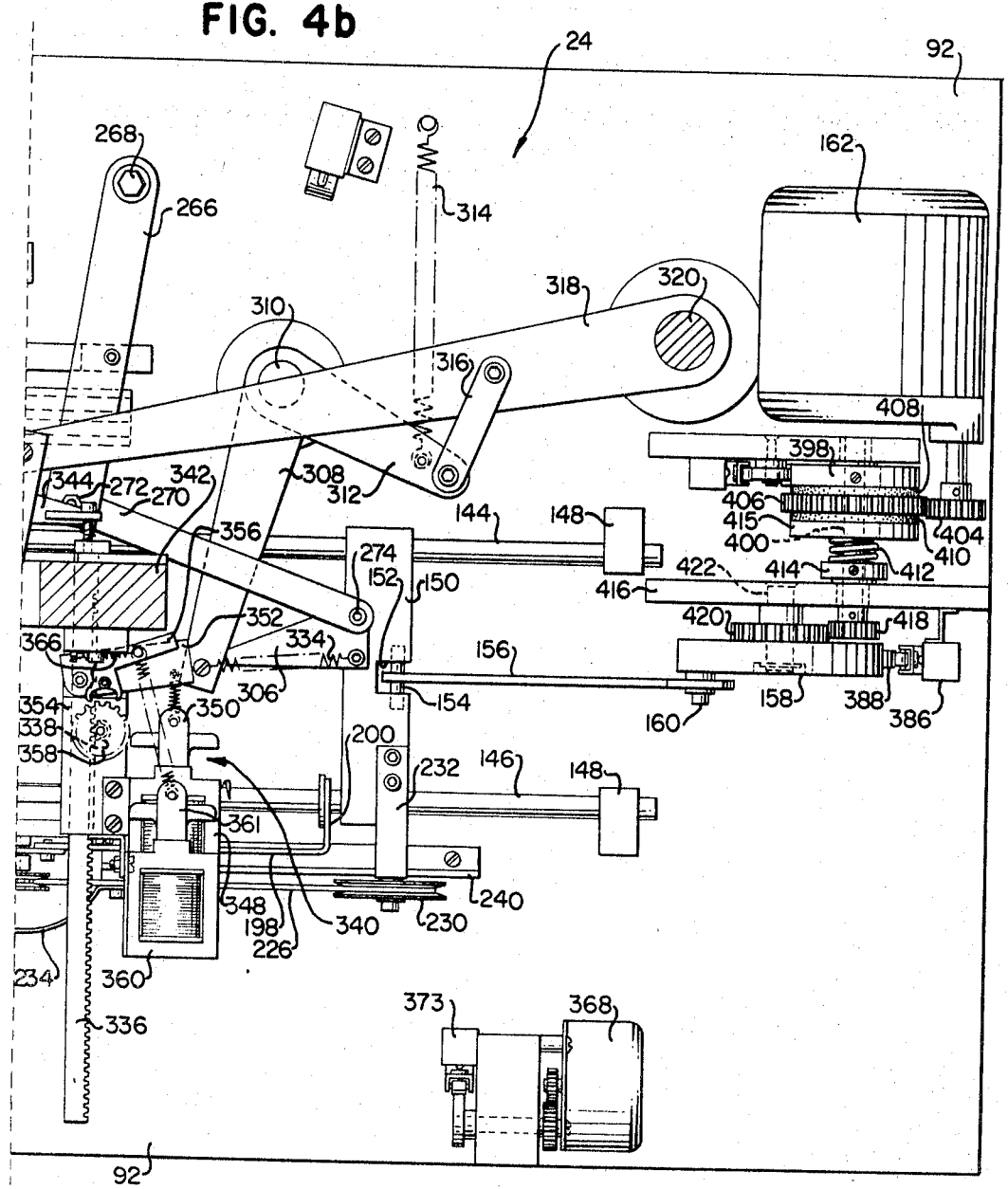

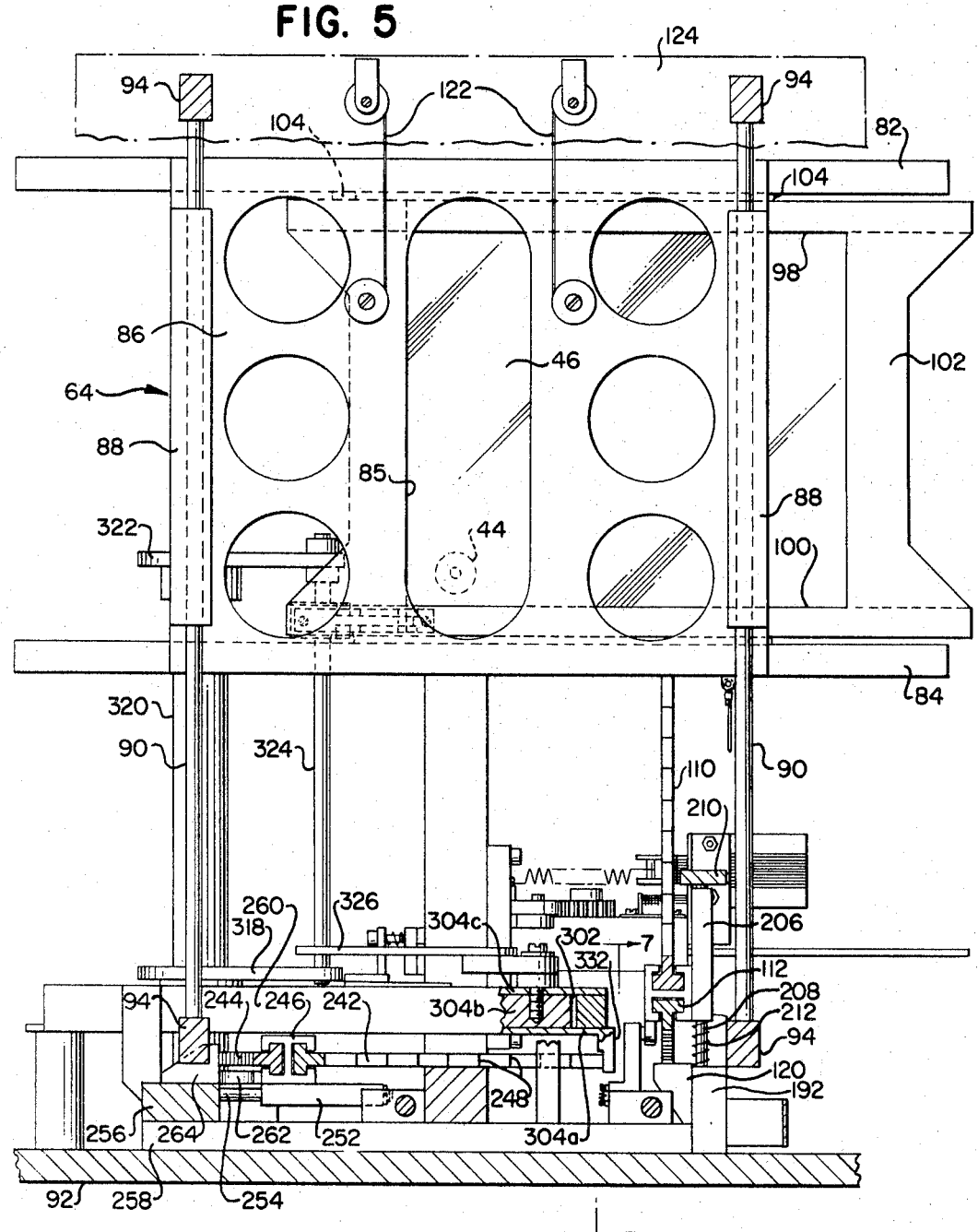

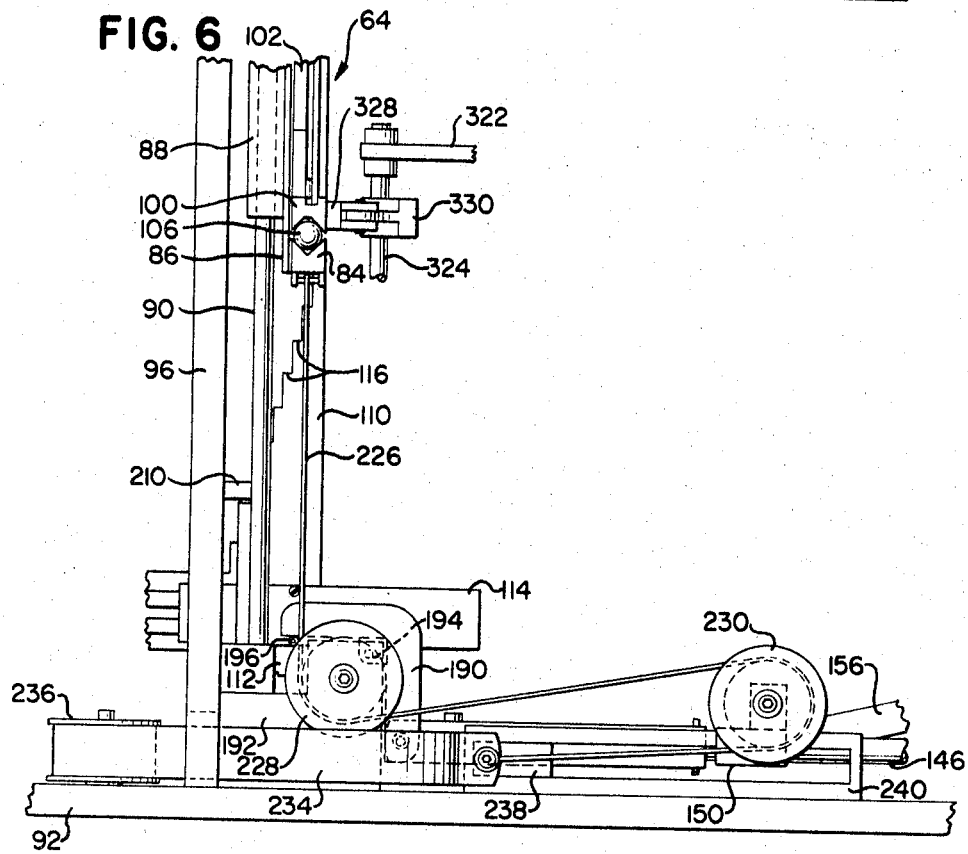
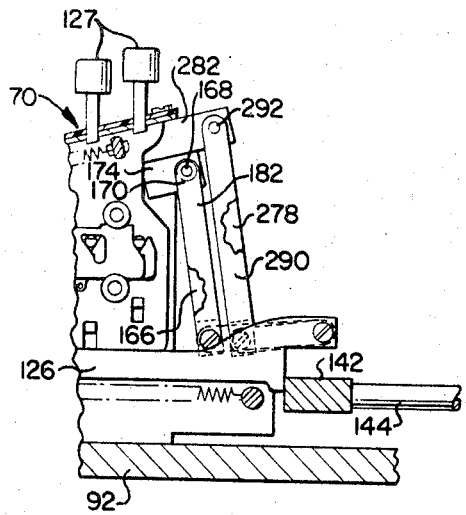
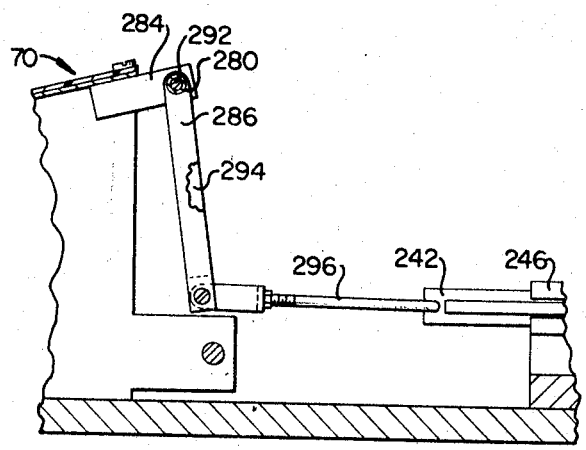

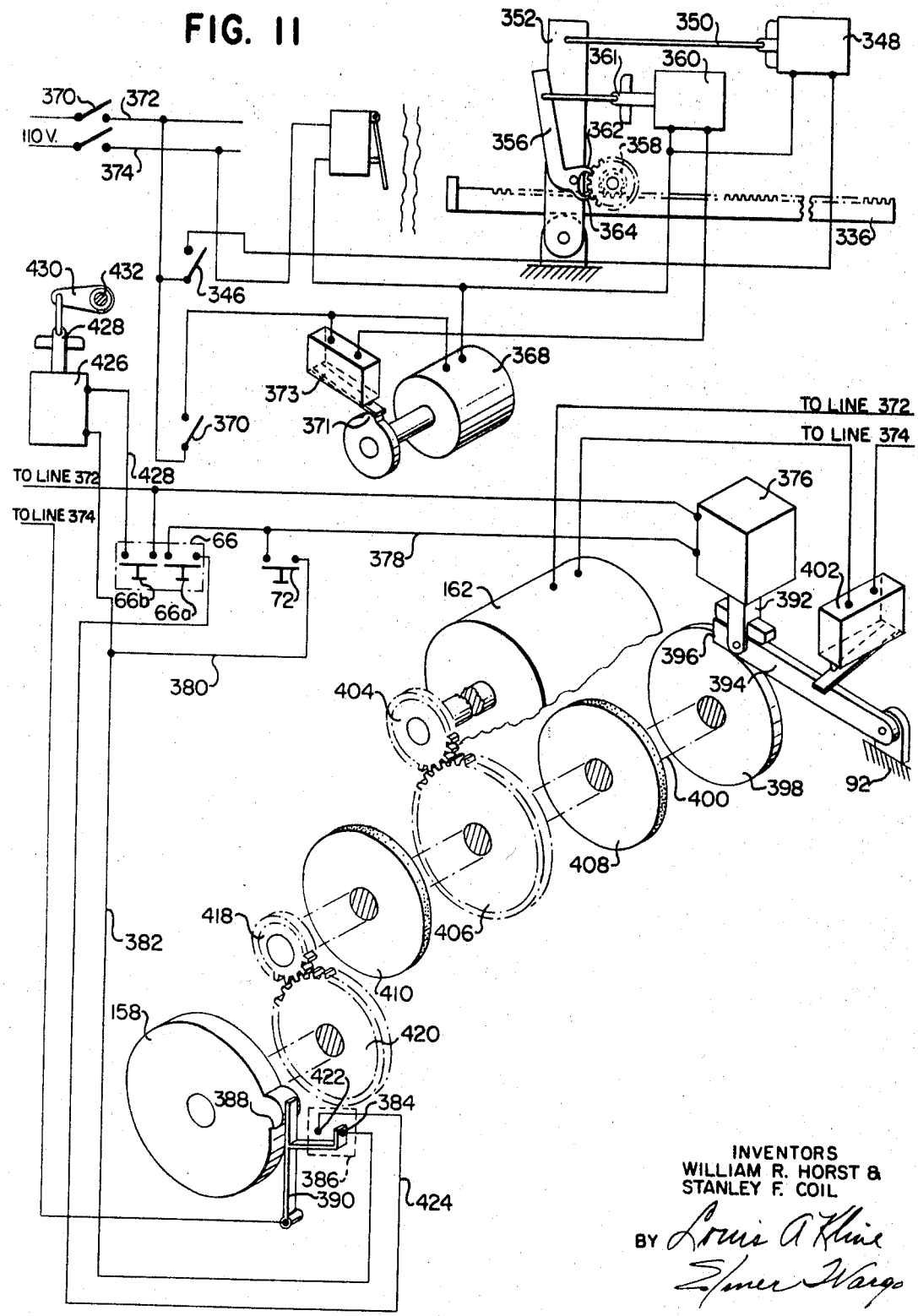

United States Patent Office 3,442,586
Patented May 6, 1969

3,442,586
FILM POSITIONING DEVICE
Stanley F. Coil, Washington Court House, and William R. Horst, Dayton, Ohio, assignors to The National Cash Register Company, Dayton, Ohio, a corporation of Maryland
Filed Oct. 14, 1966, Ser. No. 586,746
Int. Cl. G03b 27/70
U.S. Cl. 355—43    12 Claims

ABSTRACT OF THE DISCLOSURE

A positioning device including a carrier movable in a plane along $x$ and $y$ coordinates at right angles to each other. The specific $x$ and $y$ coordinates at which the carrier is to be positioned away from a home position are entered on a keyboard. Upon actuation of a positioning key, abutment members are positioned in the path of the carrier, and positioning means move the carrier away from the home position against said abutment members, so as to stop and position the carrier at the $x$ and $y$ coordinates entered upon the keyboard. Automatic means are also provided for incrementally indexing the carrier along successive coordinates in the direction of the $x$ coordinate.

---

This invention relates generally to devices of the type used for producing micro-images in rows and columns on a film and for projecting these images on a viewing screen, and is particularly concerned with the means for indexing the film containing the images in such micro-image devices.

Some of the micro-image devices of recent years utilize photosensitive films made of photochromic materials which have the inherent properties of being transparent and of containing a molecular dispersion of reversible light-sensitive dyes which become opaque on exposure to radiation in the blue-ultraviolet portion of the electromagnetic spectrum. When "exposed," or in the opaque condition, the photochromic materials can be conveniently "erased" by subjecting the exposed area to a relatively high-intensity radiation from the central portion of the optical spectrum. These photochromic materials retain their patterns or pictures until erased, and the patterns can be transferred permanently onto fine-grain, silver halide films by conventional contact printing techniques.

While the photochromic materials are in the exposed condition, the patterns, pictures, or data formed thereon can be immediately inspected on the micro-image devices previously mentioned, and, if the patterns are not satisfactory, they can be "erased," as previously explained, and re-formed on the same area. This technique can also be used to update only that portion of a film record which needs to be changed.

As the micro-images are very small, an efficient indexing system is required to accurately locate the recording of micro-images on a photosensitive film, and later retrieve them by projection techniques. For example, in a typical application, ten thousand micro-images may be placed on a single square sheet of photochromic film, which sheet measures approximately five inches on a side. The indexing mechanism of this invention is especially adaptable for use with micro-image devices and provides a simple, accurate, and inexpensive means for indexing a film in a plane along $x$ and $y$ axes at right angles to each other.

A prior-art indexing device, shown in U.S. Patent No. 2,348,457, issued to William F. Drehs on May 9, 1944, uses a separate key for each position to which the carrier is to be indexed. The necessity of one separate key for each indexing position would indeed prove cumbersome in micro-image devices which deal with ten thousand images in an area of approximately twenty-five square inches, as previously mentioned.

Another prior-art indexing device, shown in U.S. Patent No. 2,484,448, issued to Everett J. Cook on Oct. 11, 1949, utilizes handwheels for manually moving a film holder horizontally and vertically relative to the optical axis of a micro-photographic device. In applicants' mechanism, the specific location coordinates for the specific image to be positioned in the optical axis of the micro-photographic device are simply entered upon a keyboard, and a positioning key is depressed, enabling the indexing mechanism of this application to position the desired image in said optical axis.

Generally stated, applicants' indexing mechanism, which is especially useful in micro-image devices, includes a film carrier which is slidably mounted in a frame for movement in a plane along $x$ and $y$ coordinates at right angles to each other. A keyboard having actuable keys therein is provided for entering thereupon the specific combination of $x$ and $y$ coordinates corresponding to the particular image to be positioned at the optical axis of the micro-image device with which the indexing mechanism may be used. Upon actuation of a positioning key also present on the keyboard, positioning means included in the indexing mechanism are effective to index the carrier along said $x$ and $y$ coordinates and position the said particular image at the optical axis of the micro-image device. A return key on the keyboard is used to return the carrier to a home position with reference to the optical axis of the micro-image device. Applicants' indexing mechanism also includes means for automatically indexing a row of images along one of the $x$ and $y$ coordinates, which automatic indexing is especially useful for scanning images already present on a film or for exposing successive areas of a film to produce the images thereon.

The objects of this invention are:

(a) To provide a simple, accurate, and inexpensive mechanism for indexing a carrier in a plane along $x$ and $y$ axes at right angles to each other to any desired one of a multiplicity of positions;

(b) To provide a mechanism of the above type in which the carrier is positioned along said $x$ and $y$ axes is accordance with a specific combination of $x$ and $y$ coordinates entered upon a keyboard;

(c) To provide a simple, accurate, and inexpensive mechanism for indexing a film containing micro-images arranged thereon in rows and columns at right angles to one another;

(d) To provide a mechanism of the above type which also includes means for automatically indexing the film in at least one direction along said rows or columns; and (e) To provide a simple, accurate, and inexpensive mechanism for indexing a film to any one of a plurality of locations in a plane along $x$ and $y$ axes at right angles to each other, said mechanism being adaptable for use in micro-image devices, such as viewers and reducing cameras, to select a desired portion of the film.

These and other objects and advantages will become more readily understood in connection with the following description and the drawings, in which.

Figure 1:
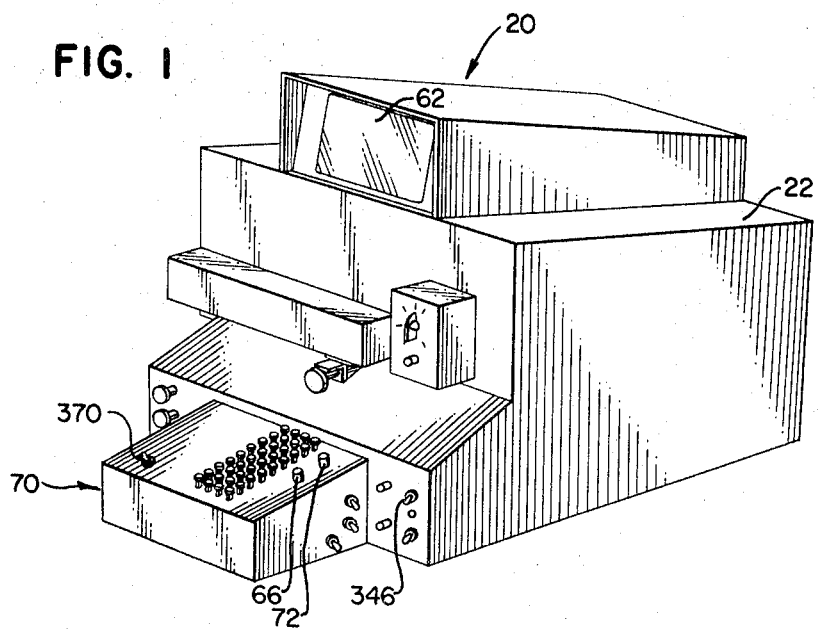
FIG. 1 is a general perspective view of a micro-image device, such as a combination reducing camera and viewer, with which the indexing mechanism of the present invention may be used.
Figure 3B:
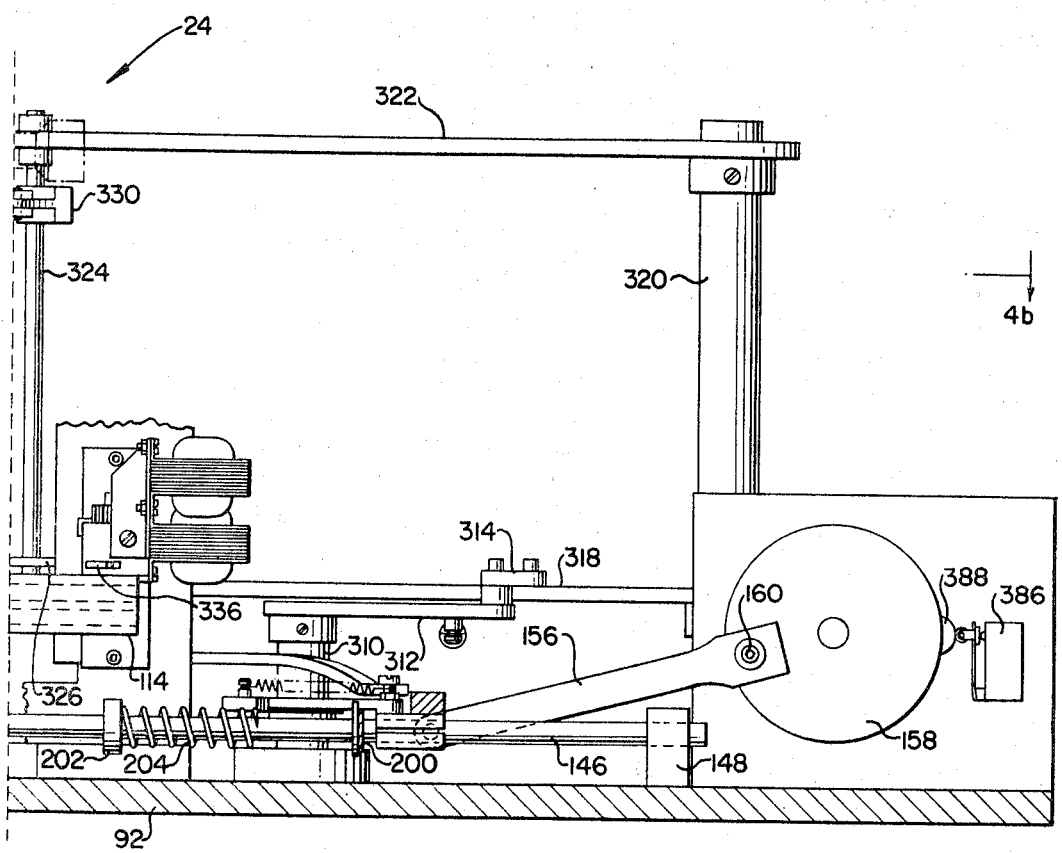
Figure 4A:
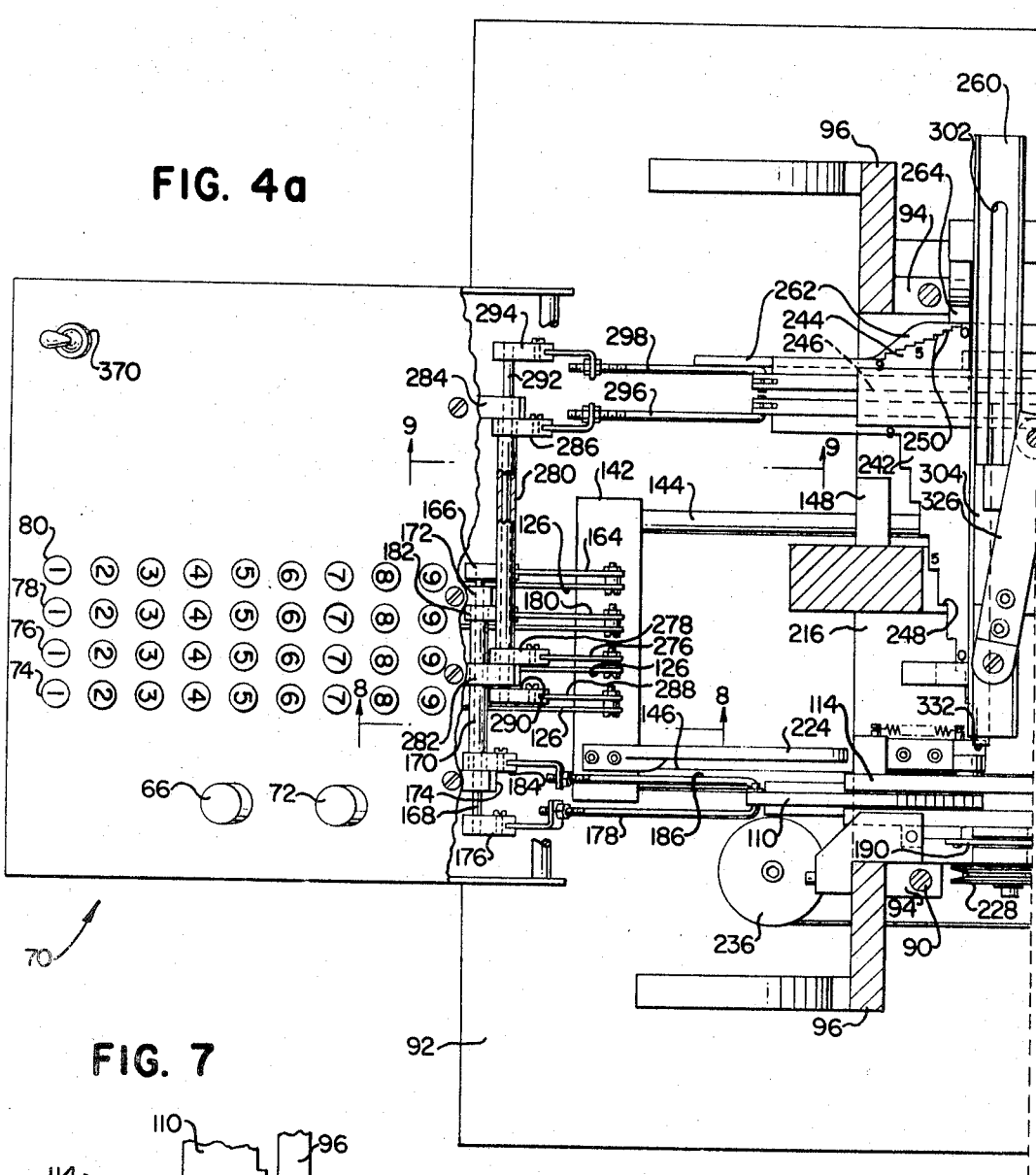
Figure 7:
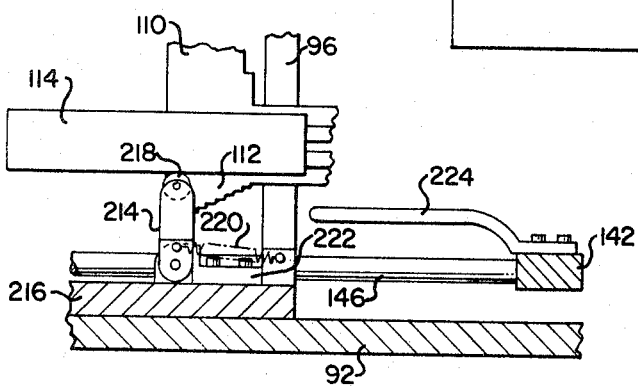

FIGS. 3a and 3b together constitute an elevational view of the right side of the indexing mechanism of this invention, as viewed in FIG. 1, showing the film carrier, the keyboard, and the abutment means for positioning the carrier in the y direction with reference to the optical axis of the micro-image device and with the cover thereof removed, only those details relating to the indexing mechanism of this device being shown in detail for ease of illustration;

FIGS. 4a and 4b together constitute a plan view of the indexing mechanism shown in FIGS. 3a and 3b and specifically show the abutment means for positioning the carrier in an x direction with reference to the optical axis of the micro-image device with which the indexing mechanism of this application may be used;

FIG. 5 is an elevational view, partly in section and taken along the line 5—5 of FIG. 3a, showing more details of the means for mounting the carrier in the frame, and also showing details of the guide block and dog used for engaging the x abutment means;

FIG. 6 is an elevational view of a portion of the invention shown in FIGS. 3a and 3b and shows the clamping means used in connection with the y abutment means;

FIG. 7 is an elevational view, partly in cross section, taken along the line 7—7 of FIG. 5, and shows the means enabling the y abutment means to return to its home position;

FIG. 8 is an elevational view, partly in cross section, taken along the line 8—8 of FIG. 4a, and shows the link operatively connecting the keyboard with the pertaining x and y abutment means which are positioned in the path of the carrier in accordance with the x and y coordinates entered upon the keyboard;

FIG. 9 is an elevational view, taken along the line 9—9 of FIG. 4a, and shows more details of the link operatively connecting the keyboard with the x abutment means;

FIG. 10 is an elevational view of a portion of the keyboard shown in FIG. 3a, and shows the means for clearing entries made upon the keyboard; and FIG. 11 is a general schematic view of the wiring diagram of the indexing mechanism of this invention, and it also shows more details of the means for automatically indexing the carrier along one of the x and y coordinates.

FIG. 1 shows a general perspective view of a micro-image device designated generally as 20 and having a housing 22, in which the indexing mechanism 24 (not shown in FIG. 1 but shown in FIGS. 3a and 3b taken together) of this invention is located. The micro-image device 20 shown is of the type which is both a reducing camera and a viewer and which device may be used in connection with photosensitive films made of the photochromic materials mentioned earlier. While the indexing mechanism 24 is disclosed in relation to such a device 20, it can be readily used in other equipment requiring the use of an indexing mechanism for precisely positioning a carrier accurately to a plurality of locations in a plane along x and y coordinates at right angles to each other.

Figure 2:
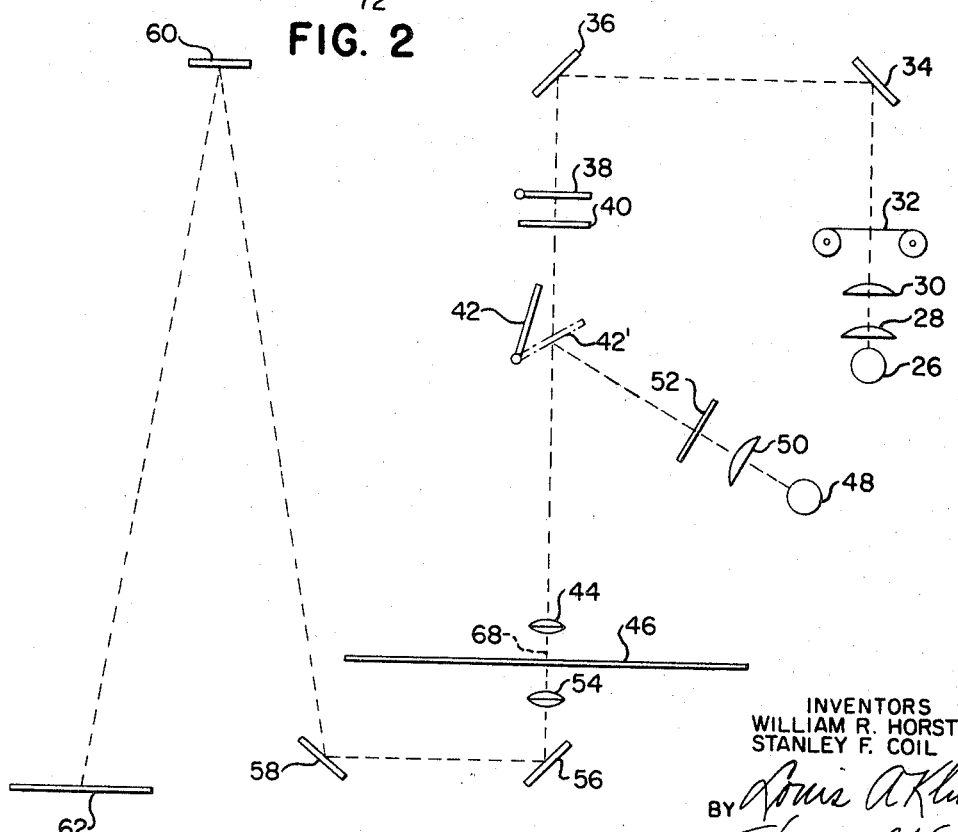
FIG. 2 is a general plan view in schematic form showing the location of the film to be indexed relative to the optical system of a micro-image device.

FIG. 2 is a general schematic view of the optical system used in the micro-image device 20 and shows the location of the film which is indexed along the x and y coordinates by the indexing mechanism 24, previously mentioned. As the optical system is not a part of this invention, it is shown only schematically and includes a source of light 26, which is directed through lenses 28 and 30 and is focused upon a negative 32, which may be a thirty-five-millimeter negative whose image is to be reduced to micro-image size by the micro-image device 20 when it is used as a reducing camera. The light rays passing through the negative 32 are reflected off mirrors 34 and 36 and pass through a shutter mechanism 38 and a filter 40, when necessary, and then bypass a pivotally mounted mirror 42 (which is swung out of the light path) to pass through a lens 44, which reduces the image and records it upon the film 46, positioned at the focal point of the lens 44. The film 46 may contain photochromic materials, as previously explained, in which case the molecular dispersion of reversible light-sensitive dyes contained therein would become opaque on exposure to radiation in the blue-violet portion of the electromagnetic spectrum, and the image would be recorded thereon. While the photochromic materials are in the exposed, or opaque, condition, the images formed thereon can be viewed immediately, as they do not require the formation of a latent image.

The means for viewing the images recorded on the film 46 when the micro-image device 20 is being used as a viewer are also shown in FIG. 2. When an image stored on the film 46 is to be "retrieved" or viewed, the pivotally mounted mirror 42 is moved to the dot-and-dash position shown at 42', and light from a second light source 48 is collected by a lens 50, passes through a light filter 52, and is reflected off the mirror 42 to the lens 44. The light passing through the lens 44 is focused upon the selected image on the film 46, and the light rays emerging therefrom pass through a lens 54 and are directed along an optical path including plane mirrors 56, 58, and 60, and are projected on a ground-glass screen 62 of the micro-image device 20, where the enlarged image can be conveniently viewed.

The general technique for using the micro-image device 20 as a viewer is as follows. The film 46 to be viewed is inserted through convenient panel openings (not shown in the drawings) in the housing 22, and is retained in a carrier designated generally as 64 (FIGS. 3a and 5). A return key 66 is then depressed to return the carrier 64 with the film 46 thereon to a home position with reference to the optical axis 68 (FIG. 2) of the micro-image device 20; the optical axis in FIG. 3a is that of the lens 54.

The film 46 has micro-images arranged thereon in rows and columns which are at right angles to one another, so that, to locate a particular image, coordinates along a row position (conveniently called by the y axis) and coordinates along a columnar position (conveniently called the x axis) must be known to position the selected image at the optical axis 68. The x and y coordinates for a particular image to be viewed are conveniently entered upon the keyboard, designated generally as 70 (FIG. 1, 3a, and 4a), and the positioning key 72 (FIGS. 1 and 4a) thereon is depressed to actuate the indexing mechanism 24, which moves the carrier 64 and the film 46, carried thereby, away from said home position to position the particular image selected at the optical axis 68. This image selected is then enlarged and is projected upon a ground-glass screen 62 by light coming from the light source 48, as previously explained with relation to FIG. 2.

The keyboard 70 in the embodiment shown in FIG. 4a has four rows of manually-depressible amount keys thereon, the rows 74 and 76 being used for the units' and tens' places, respectively, for the x location coordinates, and the rows 78 and 80 being used for the units' and tens' places, respectively, for the y location coordinates. This enables any one of one hundred rows and one hundred columns to be selected, which together enables any one of ten thousand positions on the film to be selected. The specific combination of location coordinates for the particular image to be positioned at the optical axis 68 of the micro-image device 20 is entered upon the keyboard, as illustrated in the following example. If the x location coordinate is 24 and the y location coordinate is 68, then the key for the numeral 2 is depressed in row 76 (FIG. 4a), and the key for the numeral 4 is depressed in row 74. Similarly, the key for the numeral 6 is depressed in row 80, and the key for the numeral 8 is depressed in row 78 to enter the y location coordinates on the keyboard. When a zero is part of a location coordinate, no key is depressed for the particular row position involved. After the specific location coordinates are entered upon the keyboard 70, the positioning key 72 is depressed to actuate the indexing mechanism 24, which will position the carrier 64 and the film 46, carried thereby, in accordance with the specific location coordinates entered upon the keyboard 70.

The carrier 64 is mounted for movement in a plane along x and y axes therein at right angles to each other, as shown in FIGS. 3a, 4a, and 5. The carrier 64 consists of upper and lower guide rails 82 and 84, respectively, which are secured to the plate 86 in spaced parallel relationship thereon. The plate 86 has guide members 88 secured to opposed lateral sides thereof at right angles to the upper and lower guide rails 82 and 84, respectively, and the guide members 88 are apertured to be slidably mounted on vertical guide rods 90, which are perpendicular to the base 92. The ends of the rods 90 are fixed in blocks 94 (FIG. 4a), which are secured to vertical frame supports 96, which are perpendicularly secured to the base 92. By this construction, the carrier 64 is movable vertically along a y direction relative to the base 92. A suitable opening 85 in the plate 86 (FIG. 5) enables light passing along the optical axis 68 to pass through the film in any vertical position of the carrier.

The carrier 64 is mounted for movement in an x direction, which is transverse to the movement in said y direction, and this is accomplished as follows:

The upper and lower guide rails 82 and 84 (FIG. 5), respectively, are spaced apart to receive the upper and lower side rails 98 and 100, respectively, which are maintained in spaced parallel relationship by cross members 102. The upper guide rail 82 and the side rail 98 have V-shaped grooves facing each other to receive spaced-apart ball bearings 104 (FIG. 3a) therebetween. The lower guide rail 84 and the side rail 100 are similarly spaced apart and have V-shaped grooves facing each other to receive therebetween spaced-apart ball bearings 106. The ball bearings 104 and 106 are retained in their respective guide rails 82 and 100 by suitable ball retainers (not shown) and provide a low friction mounting of the side rails 98 and 100 for movement along an x direction, which is perpendicular to the movement of the carrier 64 when it moves vertically relative to the base 92. The upper and lower side rails 98 and 100 are also provided with grooves 108 facing each other (FIG. 3a), which grooves receive the film 46. The optical axis 68 (FIG. 2) is perpendicular to the film 46, and the lenses 44 and 54 are positioned on opposed sides thereof, as shown in FIG. 3a. The upper and lower side rails 98 and 100, respectively, are also provided with suitable stops and fastening means (not shown) to retain the film 46 thereon to locate it with respect to the carrier 64, so that, when the carrier 64 is indexed away from the home position, shown in FIGS. 3a and 5, the micro-image having the x location coordinate and the y location coordinate corresponding to those entered upon the keyboard 70 will be positioned at the optical axis 68 of the micro-image device 20.

The means for indexing and positioning the carrier 64 when it is moved away from its home position along the y direction, which is perpendicular to and towards the base 92 (FIG. 3a), comprises abutment means which are positioned in the path of the carrier 64 in response to the particular y coordinates entered upon the keyboard 70. The abutment means include a y "tens" step plate 110 and a y "units" step plate 112, which are slidably mounted and retained in opposed sides of the y guide 114, as shown more clearly in FIG. 5. Both plates 110 and 112 have stepped, equally-spaced abutment stops 116 and 118, respectively, thereon, the stops corresponding to the integers 0, 5, and 9 being marked on FIG. 3a. The spacing of the abutment stops is such that ten "unit" stops equal one "tens" stop for carrier movement. With the zero stop of the y units step plate 112 resting on the y base stop 120, and with the lower guide rail 84 of the carrier 64 resting upon the zero abutment stop of the y tens step plate 110, the carrier 64 is positioned at 00 y coordinates with respect to the optical axis 68. In the home position, the carrier 64 is actually raised slightly higher above the base 92 than is shown in FIG. 3a, due to the tension of return springs 122, which are anchored to a cross member 124 and the plate 86. When the particular abutment stops 116 and 118 are positioned in the path of the carrier 64 in accordance with the specific y coordinates entered upon the keyboard 70, means to be later described are effective to pull the carrier 64 and the step plates 110 and 112 downwardly, as viewed in FIG. 3a, against the y stop 120 to insure accurate location of the carrier 64 along the y direction.

The means operatively connecting the y tens' and units' step plates 110 and 112, respectively, with the keyboard 70 are shown in FIGS. 3a, 4a, and 8. The keyboard 70 is similar in construction to that shown in U.S. Patent No. 2,755,993, issued July 24, 1956, on the application of Raymond A. Christian et al., and includes a differential actuator 126 for each of the rows 74, 76, 78, and 80 of keys thereon. Each of the keys 127 is provided with a stud 128, which is adapted to engage one of the shoulders 130 on the differential actuator 126, which are urged to the rear (as viewed in FIG. 3a) by springs 132, but are held in the position shown by zero stop pawls 134, which are pivotally mounted in the keyboard 70. Upon depression of the keys 127, studs 136 thereon will cam control slides 138 forwardly (as viewed in FIG. 3a) and thereby rotate the zero stop pawls 134 out of engagement with blocks 140, permitting the springs 132 to move the differential actuators 126 to the rear, or towards the drive motor 162 (FIG. 4b) in accordance with the keys 127 depressed.

The differential actuators 126 are also prevented from moving to the rear of the device 20, as viewed in FIG. 3a, by a restoring bar 142, which is part of the drive means for the indexing mechanism 24. The restoring bar 142 is secured to two rods 144 and 146, which are slidably mounted in spaced parallel relationship in blocks 148, as shown in FIGS. 3a and 3b. A cross-bar 150 is also secured to both rods 144 and 146. The cross-bar 150 is notched at 152 on one side thereof (FIG. 4b) to receive a pin 154, which passes through one end of a connecting rod 156, while the other end of the rod 156 is pivotally joined to a drive wheel 158 by a pin 160. The drive wheel 158 is operatively connected to a drive motor 162 by means to be described later.

Once the x and y coordinates are entered upon the keyboard 70, the positioning key is depressed to energize the drive motor 162, which in turn initiates the indexing of the carrier 64. As the drive motor 162 rotates the drive wheel 158 clockwise, as viewed in FIG. 3b, the cross-bar 150 and the restoring bar 142 move to the rear, enabling selected ones of the differential actuators 126 to be moved to the rear, as viewed in FIGS. 3a and 3b, under the influence of the springs 132 in accordance with the specific coordinates entered upon the keyboard 70. For example, if the y location coordinate for the image to be viewed is 50, the numeral 5 would be depressed in row 80 of the keyboard 70 (FIG. 4a), and no key would be depressed for the zero in row 78 for units' place. When the restoring bar 142 moves to the rear, only the differential actuator 126 for row 80 will move towards the rear of the device 20 until a shoulder 130 thereon abuts against the stud 128 (FIG. 3a) on the pertaining depressed key 127. The y tens' step plate 110 will then be positioned by linkage, to be subsequently explained, so that the stop 116 thereon, corresponding to the digit 5, will be positioned in the path of the carrier 64 as the carrier is moved towards the base 92 by means to be described later. As the units' digit of row 78 for the y location coordinate 50 is zero, and as no key is depressed in row 78 for a "zero," the zero stop pawl 134 (FIG. 3a) is effective to hold the differential actuator 126, pertaining to row 78, in the home or zero position, and, correspondingly, the y units' step plate 112 is held in the zero position, shown in FIG. 3a, in which the stop 118 corresponding to zero is positioned on the y stop 120. Clamping means, to be described later, are used to pull the y guide 114 downwardly, carrying both y step plates 110 and 112 towards the base 92 (FIG. 3a) to insure that the y step plate 112 abuts against the y stop 120 for accurate locating of the carrier 64 in the y direction.

The means operatively connecting the differential actuators 126 with the y step plates 110 and 112 are shown in FIGS. 3a, 4a, and 8. The differential actuator 126 for the key row 80 is pivotally joined to one end of a link 164 (FIG. 4a). The other end of the link 164 is pivotally joined to the lower end of a crank 166 (FIG. 8), while the upper end of the crank 166 is fixed to a shaft 168, which is rotatably mounted in support blocks 172 and 174. When the differential actuator 126 for row 80 is moved to the rear (to the right, as viewed in FIG. 4a), it is effective to move the crank 166 counter-clockwise (as viewed in FIG. 8) for an angular amount dependent upon the key 127 actuated, and, correspondingly, a crank 176 also secured to the shaft 168 is rotated counter-clockwise (as viewed in FIG. 3a). An adjustable link 178 is pivotally joined at one end to the lower end of the crank 176, and the other end is pivotally joined to the y tens' step plate 110, which is slidably mounted in the y guide 114. The differential actuator 126 for key row 78 is similarly operatively connected to the y units' step plate 112 via a link 180 (FIG. 4a), a crank 182, which is secured to one end of the tubular shaft 170, with its other end secured to a crank 184 (FIG. 4a), and adjustable link 186. The tubular shaft 170 is rotatably mounted on the shaft 168 between support blocks 172 and 174.

The means for clamping the y step plates 110 and 112 against the y stop 120 (FIG. 3a) while the carrier is moved against selected stops 116 on the y tens' step plate 110 are shown principally in FIGS. 6, 4a, and 4b. The clamping means includes an L-shaped clamping lever 190, which is pivotally joined to the block 192 by a pin 194. One end of the lever 190 engages a pin 196 on the y guide 114, and the other end of the lever 190 is pivotally joined to a link 198, having a right-angle bend portion 200 (FIG. 4b), which is apertured and slidably mounted on the rod 146. The rod 146 has a locking collar 202 (FIG. 3b) secured thereto, with a spring 204 positioned thereon between the locking collar 202 and the right-angle bend portion 200 of the link 198. When the drive wheel 158 is rotated clockwise, as viewed in FIG. 3b, the rods 144 and 146 are moved to the right of the position shown in FIGS. 3b and 4b, and the spring 204 engages the portion 200 of the link 198 and pushes it to the right to thereby rotate the clamping lever 190 counter-clockwise, as viewed in FIG. 6, to resiliently force the y guide 114 downwardly towards the base 92. Both y step plates 110 and 112 will be pulled downwardly by the clamping lever 190, as both are mounted in the y guide 114, which is slidably mounted for movement perpendicular to the base 92. If no key is depressed in row 78, the zero stop 118 on the y units' step plate 112 abuts against the y stop 120 (FIG. 3a), and, correspondingly, the y units' step plate 112 will be positioned as shown. If the numeral key 5 is depressed in units row 78, the stop 118 on the y units' step plate 112, which is marked 5 (FIG. 3a), will be positioned so as to abut against the y stop 120 when the clamping lever 190 pulls the y guide 114 downwardly towards the base 92.

The y guide 114, which is slidably mounted for movement perpendicular to the base 92, has an apertured guide member 206, which is secured thereto (FIGS. 3a and 5). The guide member 206 is slidably mounted on a rod 208, whose ends are secured in support blocks 192 and 210, and the guide member 206 and the y guide 114, secured thereto, are urged upwardly, away from the base 92 (FIGS. 3a and 5), by a spring 212 positioned on the rod 208. The y units' step plate 112 is urged upwardly away from the base 92 so as to enable the stops 118 thereon to clear the y stop 120 when the y units' step plate 112 is to be moved to the left (as shown in FIG. 3a) to return to the home position. Upon the return stroke of the cross-bar 150, the link 198 moves to the left, as viewed in FIGS. 3b and 4, and releases the clamping lever 190, enabling the spring 212 to raise the y guide 114, as previously mentioned.

The raising of the y guide 114 is also assisted by a lifter arm 214 (FIG. 7), which is pivotally mounted at one end to a plate 216, while the remaining end of the arm 214 has a roller 218 rotatably mounted thereon. A spring 220 urges the lifter arm 214 against a stop 222, enabling the arm 214 to assume the generally vertical position shown in FIG. 7, in which position the roller 218 engages the underside of the y guide 114 to assist in yieldably supporting it. When the drive motor 162 is energized and the cross-bar 142 is moved to the rear of the device (which is to the left, as shown in FIG. 7), the follower rod 224 moves to the left and moves the lifter arm 214 counter-clockwise, enabling the clamping lever 190 to move the y guide 114 downwardly until one of the selected stops 118 on the y units' step plate 112 abuts against the y stop 120.

The means for moving the carrier 64 in a y direction against the y tens' step plate 110 is shown principally in FIG. 6. The carrier 64 has one end of a cable 226 secured to the lower guide rail 84, and the cable passes around a pulley 228, which is rotatably mounted on the block 192; it also passes around a second pulley 230, which is rotatably mounted on a block 232 secured to travel with the cross-bar 150 (FIG. 4b), and the end of the cable is secured to a negator spring 234. The spring 234 is a ribbon-type spring and provides a fairly constant tension regardless of the length of the spring pulled out of its reel container 236. When the cross-bar 150 is moved to its actuated position (which is to the right of the position shown in FIG. 4b), the pulley 230 attached thereto and the cable 226 will pull the carrier 64 downwardly towards the base 92, as shown in FIG. 6, and the negator spring 234 will maintain a fairly constant pull thereon as the carrier is stopped at different stops 116 on the y tens' step plate 110 in accordance with the y coordinates entered upon the keyboard 70. When the cross-bar 150 is moved to the left (as viewed in FIG. 4b) and returns to its home position, shown, the tension on the cable 226 is relieved, enabling the return springs 122 (FIG. 5) to return the carrier 64 to its home position. The uncoiled end of the negator spring 234, to which the cable 226 is connected, is secured to a guide block 238, which is slidably mounted in a stationary guide 240 for reciprocal movement therein.

The means for indexing the carrier 64 away from its home position along the x, or horizontal, direction, which is perpendicular to the y direction, previously mentioned, comprises x abutment means which are positioned in the path of the carrier 64 in response to the particular x coordinates entered upon the keyboard 70. The x abutment means include x tens' step plate 242 and an x units' step plate 244, which are both slidably mounted and retained in opposed sides of the x guide 246, shown in FIGS. 4a and 5. Both plates 242 and 244 have stepped, equally-spaced abutment stops 248 and 250, respectively, thereon, the stops corresponding to the integers 0, 5, and 9 being marked in FIG. 4a. The spacing of the abutment stops is such that ten "unit" stops equal one "ten's" stop for carrier movement for both x and y abutment means. The home position for the carrier 64 in the x direction relative to the optical axis 68 is shown in FIG. 5. The x guide 246 is provided with a guide member 252 (FIG. 5) secured thereto, and the member 252 is slidably mounted on a rod 254, which is secured to a block 256 secured to a plate 258 in turn secured to the base 92. By this construction, the x guide 246 is movable parallel to the base 92 (FIG. 5) and is restrained against vertical movement as it is positioned between the plate 258 and the slotted stationary guide 260.

The x step plates 242 and 244 are moved to the rightmost, or home, position (as viewed in FIG. 5) by a cam rod 262, which pushes the x guide 246 to the right, enabling the x units step plate 244 to clear the x stop 264, shown also in FIG. 4a, when the crossbar 150 is moved to the home position, shown in FIG. 4b. The cam rod 262 is pivotally joined to a rod 266 between the ends thereof, and one end of the rod 266 (FIG. 4b) is pivotally secured to the base 92 by a pin 268, while the other end is pivotally joined to a link 270 by a pin 272. The remaining end of the link 270 is pivotally joined to the crossbar 150 by a pin 274. Thus, when the crossbar 150 is moved to the actuated position (which is to the right of the position shown in FIG. 4b), the cam rod 262 is withdrawn from between the x stop 264 and the x guide 246, enabling the pertaining stops 250 on the x units' step plate 244 to engage the x stop 264 in accordance with the x coordinates entered upon the keyboard 70.

The means operatively connecting the x tens' and units' step plates 242 and 244, respectively, with the keyboard 70 are shown in FIGS. 3a, 4a, 8 and 9, which means is similar to that already explained in connection with the y abutment means. The differential actuator 126 for key row 76 is pivotally joined to one end of a crank 278. The other end of the crank 278 is fixed to rotate with a tubular shaft 280, which is rotatably mounted on a shaft 292 and positioned between support blocks 282 and 284, which are secured to the keyboard 70. The remaining end of the tubular shaft 280 is fixed to a crank 286, which rotates counter-clockwise (as viewed in FIG. 9) to position the pertaining stop 248 on the x tens' step plate 242 in accordance with the digit entered upon row 76 of the keyboard. Similarly, the differential actuator 126 for the key row 74 is pivotally joined to one end of a link 288, whose remaining end is pivotally secured to one end of a crank 290. The remaining end of the crank 290 is fixed to rotate with the shaft 292, which is rotatably mounted in the support blocks 282 and 284 and which extends outwardly of the block 284 (FIG. 4a). A crank 294 is fixed to the shaft 292 to rotate counter-clockwise, as viewed in FIG. 9. An adjustable link 296 pivotally joins the crank 286 with the x tens' step plate 242, and another adjustable link 298 pivotally joins the crank 294 with the x units' step plate 244.

The means for moving the carrier 64 along the x direction are shown in FIGS. 4a, 4b, 5, and 6 and include a slotted stationary guide 260, which is positioned directly beneath the carrier 64 and adjacent to the x step plates 242 and 244. The slotted stationary guide 260 is provided with a slot 302, in which a guide block 304 (FIG. 4a) is slidably mounted and retained for movement in the x direction along said slot 302. The guide block 304 is urged to the home position (to the right as viewed in FIG. 5) by link means operatively connected with the crossbar 150 (FIG. 4b). The link means include a push bar 306 secured to the crossbar 150, which push bar 306 bears against one arm 308 of a bell crank lever which is pivotally mounted on a post 310, which in turn is secured to the base 92. The other arm 312 of the bell crank lever is urged counter-clockwise, as viewed in FIG. 4b, by a tension spring 314, whose stationary end is secured to the base 92. The arm 312 of the bell crank lever has one end of a link 316 pivotally joined thereto, and the other end of the link 316 is pivotally joined to a lower arm 318 between the ends thereof. One end of the lower arm 318 is fixed to a shaft 320, which is rotatably mounted in the base 92. An upper arm 322 (FIG. 5) is also fixed to the shaft 320 in vertical alignment with the lower arm 318, so that both arms rotate in unison. The free ends of the arms 318 and 322 have aligned apertures therein to receive a rod 324 (FIGS. 4b and 5), which is secured to both arms. A link 326 has one end pivotally secured to the guide block 304, and the other end is pivotally secured to the rod 324, as shown in FIG. 5. The lower side rail 100 (FIG. 3a) of the carrier 64 has a bifurcated member 328 fixed thereto, which member 328 pivotally receives one end of a link 330. The remaining end of the link 330 slidably receives the rod 324, enabling the member 330 to rotate relative to the rod 324 and to slide up and down thereon, as viewed in FIGS. 3a and 3b. This construction enables the carrier 64 to be moved in the x direction while it is also being moved in the y direction.

The means for stopping the carrier 64 along the x direction includes a dog 332 (FIG. 5), which is secured to the plate 304a, which is secured to one side of a block 304b. A second plate 304c is secured to the opposite side of the block 304b forming the guide block 304. The guide block 304 is mounted on the stationary guide 260 (H-shaped in cross section) to slide in the slot 302 in a direction which is parallel to the base 92. The dog 332 extends downwardly from the guide block 304 (FIG. 5) to engage the stops 248 on the x tens' step plate 242 when the stops are placed in its path. After the x coordinates are entered upon rows 74 and 76, and the y coordinates are entered upon rows 78 and 80, of the keyboard 70 and the positioning key 72 is depressed, the drive motor 162 is actuated to move the crossbar 150 and the restoring bar 142 to the right of the position shown in FIGS. 4a and 4b. As the restoring bar 142 moves to the right, the differential actuators 126 are set according to the coordinates entered upon the keyboard 70, and the x tens' and units' step plates 242 and 244, respectively, are moved to the right, as viewed in FIG. 4a. When the x tens' step plate 242 is moved to the right, the abutment stop 248 thereon, corresponding to the amount entered in row 76, will be positioned in the path of the dog 332 as it moves to the left, as viewed in FIG. 5. The x units' step plate 244 will also be moved to the right, as viewed in FIG. 4a, so that the abutment stop 250 thereon, corresponding to the amount entered in row 74, will be positioned opposite the x stop 264. As the crossbar 150 moves to the right from the position shown in FIG. 4b, it is effective through the links 270 and 266 to withdraw the cam rod 262 from between the x stop 264 and the x guide 246, enabling the guide 246 to be moved to the left, as viewed in FIG. 5, so that the pertaining stop 250 on the x units' step plate 244 can engage the x stop 264.

As the crossbar 150 moves to the right, the spring 334, which is secured to the arm 308 and the crossbar 150, assists the spring 314 in rotating the arm 312 of the bell crank counter-clockwise, as viewed in FIG. 4b, which in turn rotates the arm 318 clockwise. The clockwise direction of the arm 318 is effective through the rod 324 and the lower side rail 100 to move the film 46 carried thereby to the left, as viewed in FIG. 5, along with the guide block 304, until the dog 332, carried thereby, engages the selected stop 248 on the x tens' step plate 242, and the selected stop 250 on the x units' step plate 244 engages the x stop 264 to thereby accurately position the carrier 64 along the x direction.

The indexing means 24 of this invention also includes means for automatically indexing the carrier 64 along one direction, which in the embodiment shown is the x direction. The automatic indexing means are shown principally in FIG. 4b. To enable the automatic indexing means to become effective, it is necessary to prevent stops of the x tens' and units' plates 242 and 244, respectively, from being positioned in the path of the carrier 64. This is best accomplished by depressing digit keys 9 in both rows of keys 74 and 76, and when the positioning key 72 is depressed, the carrier 64 would be normally moved all the way to the left, as viewed in FIG. 5, so that the micro-image having x coordinates 99 would be positioned at the optical axis of the micro-image device 20. However, instead of moving freely to the left, as previously explained, the guide block 304 (FIG. 5) is restrained from moving to the left (as viewed in FIG. 5) by a rack 336 and a pinion 338 (FIG. 4b) under the control of switch-operated pawl means generally designated 340.

The rack 336 is slidably mounted in a central vertical support 342 (FIG. 4b), and one end of the rack is fixed to travel with a bracket 344, which in turn is secured to the guide block 304. When the indexing means 24 is manually operated, the rack 336 merely slides in the vertical support 342 along with the guide block 304, to which it is attached; however, when the automatic indexing means is energized, the pawl means 340 is energized, and the guide block 304 is incrementally released under the control of the pawl means 340, so as to position successive images of the film 46 at the optical axis 68 of the device 20.

The pawl means 340 controls the automatic indexing in the x direction as follows: When the switch 346 (FIGS. 1 and 11) is closed, it completes a circuit to the solenoid 348, whose actuator 350 is withdrawn to pull the plate 352 clockwise, as viewed in FIG. 4b. The plate 352 is pivotally mounted on a support bar 354, which is secured to the central vertical support 342. The plate 352 carries a pawl 356, which is pivotally mounted thereon (FIG. 4b) and which engages the gear 358 (as shown in FIGS. 4b and 11) when the solenoid is energized. The gear 358 is rotatably mounted in the support bar 354 and is also fixed to rotate with the pinion 338, which is in mesh with the rack 336. Normally, the switch 346 is closed before the positioning key 72 is depressed, to insure that the guide block 304 (FIG. 4a) and the rack 336 will be restrained against movement by the pawl 356, except as released thereby.

When the pawl 356 engages the gear 358, it prevents the gear 358 from rotating, except when the solenoid 360 is momentarily energized. When the solenoid 360 is energized, its actuator 361 pulls the pawl 356 clockwise, as viewed in FIG. 11, and the upper leg 362 of the pawl 356 is brought in mesh with the gear 358 as the lower leg 364 of the pawl 356 is pulled out of engagement therewith, allowing partial rotation of the gear 358 in a clockwise direction, as viewed in FIGS. 4b and 11. When the solenoid 360 is deenergized, the pawl 356 rotates counterclockwise under the influence of the spring 366 (FIG. 4b), and the lower leg 364 engages before the leg 362 releases the gear 358, thereby completing indexing of one micro-image space on the film 46.

The means for momentarily energizing the solenoid 360 includes a small electric motor 368, which is fixed to the base 92 (FIG. 4b) and which is connected to a source of voltage when the switch 370 (FIG. 11) is closed. The speed of the motor 368 is suitably controlled for the desired indexing interval, and a cam 371 (FIG. 11), secured to the shaft of the motor, will actuate a switch 373, thereby completing the momentary energization of the solenoid 360. If a variable speed for automatically indexing the carrier 64 in the x direction is required, the motor 368 and the cam 371 can be replaced with other suitable timer means, such as an electric timer (not shown) which will periodically energize the solenoid 360 at time intervals adapted to be easily varied.

When the x and y coordinates for the image to be viewed are entered upon the keyboard 70 for manual operation, and the line switch 370 is closed, depression of the positioning key 72 actuates the indexing means 24 as follows: The positioning key 72 is actually a switch, as shown in FIG. 11, and when it is closed, a circuit is completed from the line 372 over a solenoid 376, via the line 378, the positioning key 72, the line 380, the line 382 to the terminal 384 of a single pole double throw switch 386, shown also in FIG. 3b. When the restoring bar 142 and the crossbar 150 are in the home positions, shown in FIGS. 4a and 4b, the cam 388 on the drive wheel 158 pushes the switch arm 390 against the terminal 384, thereby completing the circuit for the solenoid 376 to the line 374.

in order to receive connecting plugs of all designs whether foreign or American plugs with or without grounds.

FIGURE 7 shows only a portion of the upper part of the current distributor casing. This purely schematic view shows that the casing 31 comprises a series of apertures When the solenoid 376 is energized, its plunger 392 (FIG. 11) is withdrawn, pulling the left end of the lever 394 upwardly out of a notch 396 on a plate cam 398 secured to a shaft 400. The right end of the lever 394, as viewed in FIG. 11, is pivotally secured to the base 92, and a switch 402, positioned between the ends of the lever 392, is closed when the solenoid 376 is energized, thereby connecting the motor 162 with the lines 372 and 374. The motor 162 drives a gear 404 in mesh with a gear 406, which is rotatably mounted on the shaft 400. The shaft 400 is not directly driven by the gear 406, but is frictionally driven by a pair of leather discs 408 and 410, which are placed on opposed sides of the gear 406 and which are also sandwiched between the plate cam 398 and the plate 415 (FIG. 4b). The discs 408 and 410 are kept in frictional engagement with the gear 406 by a spring 412, positioned between a collar 414, which is fixed to the shaft 400, and a plate 415, which is slidably mounted on the shaft 400 for axial movement thereon but fixed to rotate therewith. The plate cam 398 is fixed to rotate with the shaft 400, which is rotatably mounted in the support 416. The shaft 400 has a gear 418 fixed to rotate therewith, and the gear 418 drives a gear 420 and also the drive wheel 158, which is fixed to rotate with the gear 420. Both the gear 420 and the drive wheel 158 are rotatably mounted on a shaft 422, which is mounted in the support 416.

As soon as the drive motor 162 is energized, it rotates the drive wheel 158 by the means described in the previous paragraph, and, as soon as the plate cam 398 (FIG. 11) makes a complete revolution, the plunger 392 will again drop into the notch 396 (after riding on the periphery of the plate cam 398) to open the switch 402 and deenergize the drive motor 162. The plunger 392 is permitted to drop into the notch 396 because the solenoid 376 is energized only momentarily and is deenergized as soon as the shaft 400 rotates the cam 388 on the drive wheel 158 away from the switch arm 390. When the cam 388 moves away, the switch arm 390 (FIG. 11) is spring-urged away from the contact 384 to the contact 422 to deenergize the solenoid 376; however, as the plunger 392 rides on the periphery of the plate cam 398 before dropping into the notch 396, the left side of the lever 394 remains up (as viewed in FIG. 11) to keep the switch 402 closed and the drive motor 162 running. The drive plate 158 will rotate 180 degrees clockwise from the position shown in FIG. 3b for a 360-degree rotation of the plate cam 398, and during this movement the restoring bar and the crossbar 150 will be effective to position the carrier 64, as previously mentioned.

To return the carrier 64 to the home position or to index the carrier from one selected position to another selected position when the indexing means 24 is being operated manually, the following procedure is used. The return key 66 is first actuated to return the carrier 64 to the home position. As seen in FIG. 11, the return key 66 actually controls two separate switches 66a and 66b. When the carrier 64 is at some selected position, the drive wheel 158 is rotated 180 degrees from the position shown in FIGS. 3b and 11, and the switch arm 390 engages the contact 422 (FIG. 11). When the return key 66 is actuated, both switches 66a and 66b, which were open, are then closed. Current from the line 374 (FIG. 11) passes along the switch arm 390 and the contact 422 through the closed switch 66a, along the line 378 to the solenoid 376 and out the line 372. When the solenoid 376 is energized, the arm 392 will be pulled inwardly, pulling the arm 394 along therewith to close the switch 402, which energizes the drive motor 162, as previously explained, to return the drive wheel 158 to the home position, shown in FIGS.

3b, 4b, and 11. The positioning key has to be only momentarily actuated to return the carrier 64 to the home position, and, if the positioning key is so actuated, the keyboard 70 will not be cleared. When the carrier 64 returns to the home position and the switch arm 390 is in the home position, shown in FIG. 11, depression of the key 66 again will close both switches 66a and 66b; however, the switch 66a will not be effective to energize the solenoid 376, because the switch arm engages the contact 384 and not the contact 422, but the solenoid 426 (FIGS. 10 and 11) will be energized to clear the keyboard 70 as follows: With the switch arm 390 engaging the contact 384, current from the line 374 passes to the line 382, to the solenoid 426, to the line 428, through the closed switch 66b to the line 372. When the solenoid 476 is energized, its actuator arm 428 is pulled inwardly to rotate the crank 430 and the shaft 432, secured thereto, counter-clockwise, as viewed in FIG. 11, to release the depressed keys 127 on the keyboard 70 by known techniques. A new combination of x and y coordinates may then be entered upon the keyboard 70, and the positioning key 72 may again be depressed to actuate the indexing mechanism 24.

If the return key 66 is only momentarily depressed and is not kept depressed after the carrier 64 is returned to the home position, the last entries made upon the keyboard 70 will still remain thereon, as the keyboard-clearing solenoid 426 would not have been energized. This is helpful when manually indexing, for example: if the y coordinates are set at 20, and the last x coordinates were set at 01, and if the next image to be viewed has coordinates (y, 20; x, 02), only the key marked as a 2 in row 74 (FIG. 4a) need be depressed to enter the new setting on the keyboard. If the keyboard were cleared, all x and y coordinates would have to be entered even though only one digit of the four location coordinates has changed.

What is claimed is:

1. A positioning device comprising:
   frame means;
   carrier means having a home position in said frame means and being slidably mounted therein for movement in a plane along x and y coordinates at right angles to each other;
   keyboard means having a positioning key and actuable keys for entering thereupon, at random, specific x and y coordinates at which said carrier means will be positioned away from said home position;
   and positioning means operatively connected to said keyboard means and said carrier means so as to position said carrier means away from said home position according to the x and y coordinates randomly entered upon said keyboard means upon the actuation of said positioning key,
   said positioning means including selectively operable automatic means for incrementally indexing said carrier means away from said home position along successive coordinates in the direction of one of said x and y coordinates.

2. A positioning device comprising:
   frame means;
   carrier means having a home position in said frame means and being slidably mounted therein for movement in a plane along x and y coordinates at right angles to each other;
   keyboard means having a positioning key for entering thereupon the specific x and y coordinates at which said carrier means will be positioned away from said home position;
   x abutment means slidably mounted on said frame means and having a plurality of abutment stops thereon;
   y abutment means slidably mounted in said frame means and having a plurality of abutment stops thereon;
   means for positioning said x and y abutment means in response to the actuation of said positioning key so as to position selected ones of said abutment stops of said x and y abutment means in the path of said carrier means as it is moved in said plane along said x and y coordinates respectively;
   and means for moving said carrier means away from said home position along said x and y coordinates in response to the actuation of said positioning key so as to bring said carrier means in abutting engagement with said selected ones of said abutment stops of said x and y abutment means to thereby stop and position said carrier means at said specific x and y coordinates entered upon said keyboard means.

3. The positioning device as claimed in claim 2 in which said x abutment means includes a stepped plate for tens' place and a stepped plate for units' place, and in which said y abutment means includes a stepped plate for tens' place and a stepped plate for units' place.

4. A mechanism for indexing a multiple frame film in a microphotographic device having a fixed optical axis which is perpendicular to the plane in which the film is indexed, said mechanism comprising:
   frame means;
   carrier means having a home position relative to said optical axis and being reciprocably mounted in said frame means for movement along x and y coordinates at right angles to each other and adapted to hold said film for movement in said plane, each said frame of said film having a specific combination of x and y location coordinates with respect to said optical axis;
   keyboard means having actuable keys for entering thereupon at random the specific combination of x and y coordinates for the particular frame of said film selected to be positioned at said axis, said keyboard means also having a positioning key and a return key for said carrier means;
   x abutment means having a plurality of stepped abutment stops thereon;
   x guide means in which said x abutment means is reciprocably mounted so as to present different ones of said abutment stops in the path of said carrier means as it is moved away from said home position along said x coordinates;
   y abutment means having a plurality of abutment stops thereon;
   y guide means in which said y abutment means is reciprocably mounted so as to present different ones of said last-named abutment stops in the path of said carrier means as it is moved away from said home position along said y coordinates;
   and drive means mounted in said frame means and operatively connected to said keyboard means, said x and y abutment means, and said carrier means;
   said drive means being effective upon the actuation of said positioning key to position specific ones of said abutment stops of said x and y abutment means in the path of said carrier means as said carrier means is moved away from said home position by said drive means to thereby stop and position said carrier means so that the said particular frame on said film corresponding to the combination of x and y coordinates entered on said keyboard means will be positioned at said optical axis, said carrier means being returned to said home position by said drive means upon actuation of said return key.

5. A positioning device comprising:
   frame means;
   carrier means having a home position in said frame means and being slidably mounted therein for movement in a plane along x and y coordinates at right angles to each other;
   keyboard means having a positioning key, a return key, and actuable keys for entering thereupon the specific x and y coordinates at which said carrier means will be positioned away from said home position;
   driving means having a drive member reciprocably mounted in said frame means for movement between home and away positions therein;

x abutment means slidably mounted in said frame means and having a plurality of stepped abutment stops thereon and also having a home position;

means operatively connecting said $x$ abutment means with said drive member;

$y$ abutment means slidably mounted in said frame means and having a plurality of stepped abutment stops thereon and having a home position;

means operatively connecting said $y$ abutment means with said drive member;

means operatively connecting said carried means with said drive member;

$x$ connecting means joining said $x$ abutment means with said keyboard means;

and $y$ connecting means joining said $y$ abutment means with said keyboard means;

said driving means being effective upon the actuation of said said positioning key to move said drive member from said home position to said away position enabling selected ones of said abutment stops of said $x$ and $y$ abutment means to be positioned by said $x$ and $y$ connecting means respectively in the path of said carrier means according to said specific $x$ and $y$ coordinates entered upon said keyboard means as said carrier means is moved away from said home position by said driving means, thereby stopping said carrier means at said specific $x$ and $y$ coordinates away from said home position;

said driving means being effective upon the actuation of said return key to move said drive member from its said away position to its said home position enabling said $x$ and $y$ connecting means to return said $x$ and $y$ abutment means respectively to their said home positions, said driving means also being effective to return said carrier means to its said home position upon said actuation of said return key.

6. The device as claimed in claim 5 in which said $y$ abutment means comprises:

$y$ guide means slidably mounted in said frame means;

and first and second planar $y$ abutment members slidably mounted in said $y$ guide means with each said $y$ abutment member having a plurality of said abutment stops in stepped relation thereon;

said keyboard means having first and second rows of said actuable keys, with said rows having first and second differential members respectively associated therewith;

said $y$ connecting means having first and second link connecting means operatively connecting said first and second planar $y$ abutment members respectively with said first and second differential members respectively so as to differentially position said first and second planar $y$ abutment members in the path of said carrier means according to the specific $y$ coordinates entered upon said keyboard means;

and a stationary $y$ stop secured to said frame means;

said first and second planar $y$ abutment members lying in a common plane and being mounted on opposed sides of said $y$ guide means with each successive stepped abutment stop of said first and second planar $y$ abutment members, as viewed in a direction away from said keyboard means, being spaced farther from said $y$ guide means than the respective preceding said abutment stop, said abutment stops on said second planar $y$ abutment member being adapted to to engage said stationary $y$ stop, and said abutment stops on said first planar $y$ abutment adapted to engage said carrier means so as to stop and position said carrier means away from said home position at the said specific $y$ coordinates entered upon said first and second rows of said actuable keys.

7. The device as claimed in claim 6 further comprising clamping means operatively connected to said $y$ guide means and adapted to resiliently urge said $y$ guide means towards said stationary $y$ stop.

8. The device as claimed in claim 5 in which said $x$ abutment means comprises:

$x$ guide means slidably mounted in said frame means;

first and second planar $x$ abutment members slidably mounted in said $x$ guide means, with each said $x$ abutment member having a plurality of said abutment stops in stepped relation thereon;

said keyboard means having first and second rows of said actuable keys, with said rows having first and second differential members respectively associated therewith;

said $x$ connecting means including first and second link connecting means operatively connecting said first and second planar $x$ abutment members respectively with said first and second differential members respectively so as to differentially position said first and second planar $x$ abutment members in the path of said carrier means according to specific $x$ coordinates entered upon said keyboard means;

said first and second planar $x$ abutment members having their respective said abutment stops positioned in additive relationship according to said specific coordinates entered upon said first and second rows of said keyboard means so as to stop said carrier means away from said home position at the said specific $x$ coordinates entered upon said first and second rows of said actuable keys.

9. The device as claimed in claim 5 in which said means operatively connecting said carrier means with said drive member includes resilient means to urge said carrier means away from said home position for movement along said $x$ coordinates;

said device further comprising automatic indexing means selectively operable to engage said carrier means upon actuation of said positioning key and intermittently release said carrier means enabling said last-named resilient means to urge said carrier means away; from said home position along successive coordinates.

10. The device as claimed in claim 9 in which said automatic indexing means comprises:

a rack gear slidably mounted in said frame means and having one end secured to said carrier means;

a pinion pivotally mounted in said frame means and in mesh with said rack gear;

a ratchet wheel fixed to rotate with said pinion;

a pivotal arm having one end pivotally secured to said frame means;

a pawl member pivotally mounted on said pivotal arm;

actuating means selectively operable to pivot said pivotal arm so as to bring said pawl member into operative engagement with said ratchet wheel;

and second actuating means selectively operable to periodically pivot said pawl member so as to periodically release said ratchet wheel enabling said resilient means to urge said carrier means away from said home position.

11. In a micro-image viewer for reading a film having a plurality of micro-images arranged thereon in rows and columns along $x$ and $y$ coordinates respectively with each said image having its own specific combination of $x$ and $y$ location coordinates, said viewer having a viewing screen, a projection lens system, and a light source means operatively arranged therein to focus an enlarged picture of said micro-images on said screen when said film is positioned between said light source means and said projection lens system, the improvement comprising positioning means for positioning selected ones of said images of said film between said light source means and said projection lens system, and comprising:

frame means;

film carrier means slidably mounted in said frame means for movement in a plane along said $x$ and $y$ coordinates at right angles to one another;

keyboard means having actuable keys therein for selecting said $x$ and $y$ coordinates at which said carrier means will be positioned to thereby select the particular micro-image to be viewed;

settable member means reciprocably mounted in said frame member and also having a plurality of abutment stops thereon, said settable member means being positioned in response to selective actuation of said keys so as to position selected ones of said abutment stops in the path of said carrier means as it is moved along said $x$ and $y$ coordinates;

and resilient means for moving said carrier means in said $x$ and $y$ directions so as to bring said carrier means into operative engagement with said selected ones of said abutment stops to thereby stop and position said carrier means at the $x$ and $y$ coordinates selected so that the selected micro-image may be positioned between said light source means and said projection lens system for projection onto said viewing screen.

12. A positioning device comprising:
frame means;
carrier means having a home position in said frame means and being slidably mounted therein for movement in a plane along $x$ and $y$ location coordinates at right angles to each other;
$x$ guide means slidably mounted in said frame means;
first and second $x$ abutment members slidably mounted in said $x$ guide means, with each said abutment member having a plurality of abutment stops in stepped relation thereon;

said first and second $x$ abutment members being adapted to have their respective abutment stops positioned in additive relation;

$y$ abutment means slidably mounted in said frame means and having a plurality of abutment stops thereon;

means for positioning said first and second $x$ abutment members and said $y$ abutment means so as to position selected ones of said abutment stops in the path of said carrier means as it is moved in said plane along said $x$ and $y$ coordinates;

and means for moving said carrier means in said plane away from said home position so as to bring said carrier means into abutting engagement with said selected ones of said abutment stops to thereby stop and position said carrier means at preselected $x$ and $y$ location coordinates.

References Cited

UNITED STATES PATENTS 2,348,457   5/1944   Drehs.

FOREIGN PATENTS 720,704   11/1965   Canada.

JOHN M. HORAN, *Primary Examiner.*

R. L. MOSES, *Assistant Examiner.*

U.S. Cl. X.R.

353—27; 355—45

U.S. DEPARTMENT OF COMMERCE

PATENT OFFICE

Washington, D.C. 20231

UNITED STATES PATENT OFFICE

CERTIFICATE OF CORRECTION

Patent No. 3,442,586                                                                  May 6, 1969

Stanley F. Coil et al.

It is certified that error appears in the above identified patent and that said Letters Patent are hereby corrected as shown below:

Column 12, lines 1 to 5, cancel "in order to receive connecting plug of all designs whether foreign or American plugs with or without grounds. FIGURE 7 shows only a portion of the upper part of the current distributor casing. This purely schematic view shows that the casing 31 comprises a series of apertures".

Signed and sealed this 14th day of April 1970.

(SEAL)
Attest:

Edward M. Fletcher, Jr.                                         WILLIAM E. SCHUYLER, JR.

Attesting Officer                                                       Commissioner of Patents